April 3, 1951 J. H. GIBBONS 2,547,157
CUTOFF MECHANISM
Filed Feb. 13, 1947 5 Sheets-Sheet 4
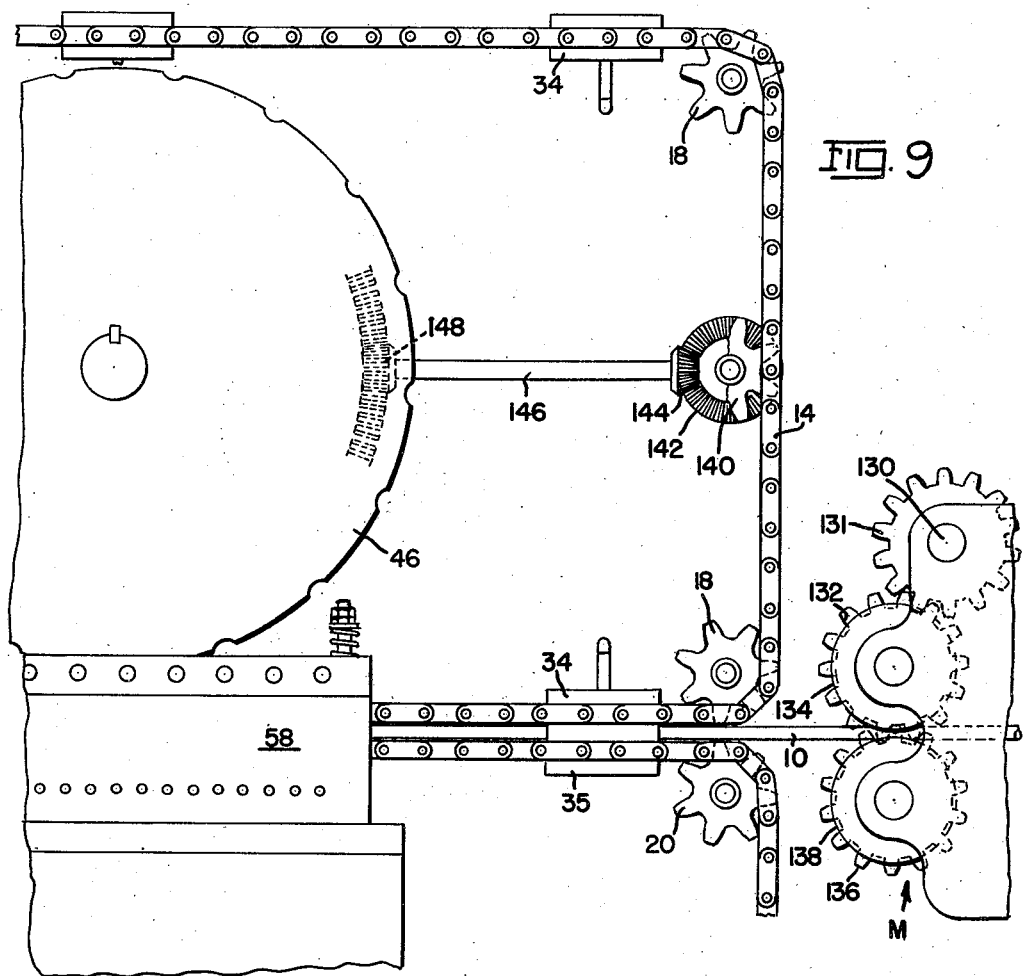
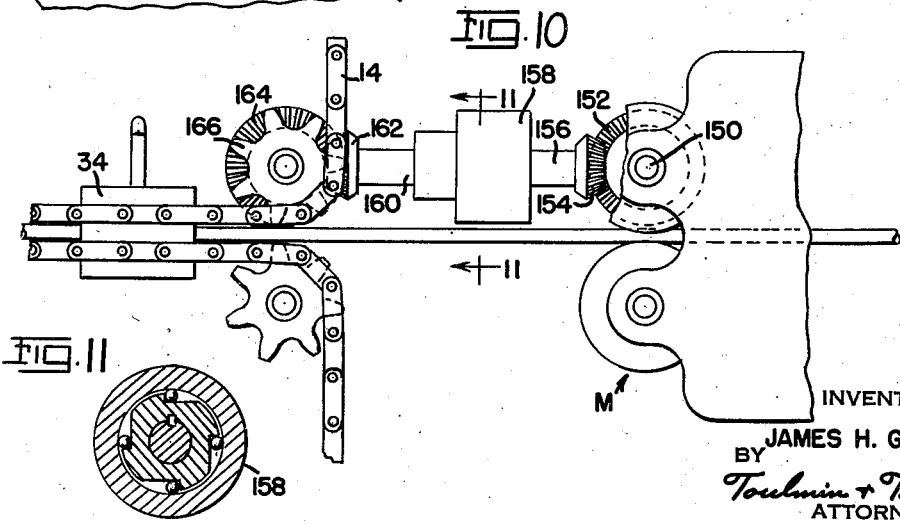
INVENTOR
JAMES H. GIBBONS
BY
Toulmin + Toulmin
ATTORNEY

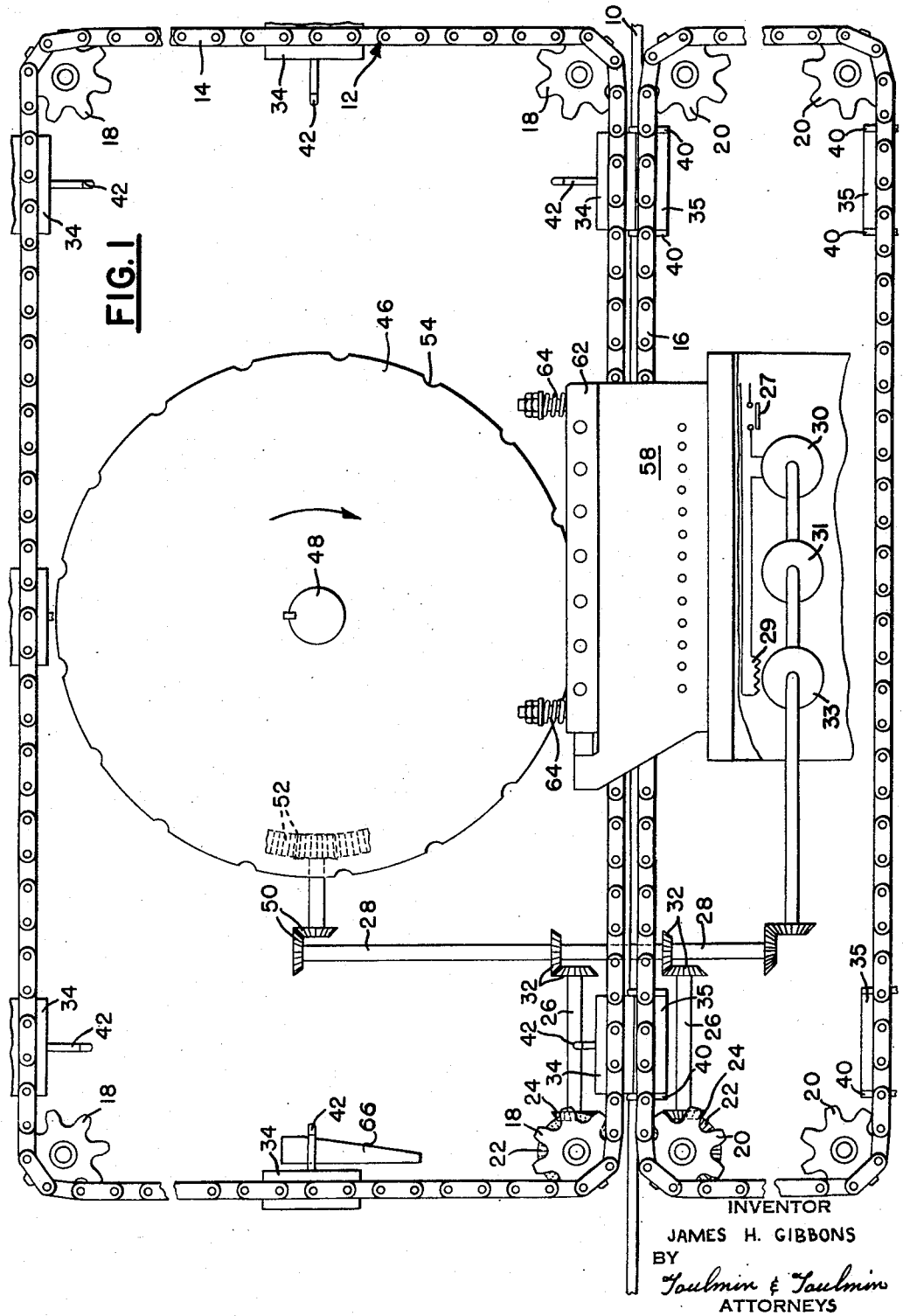

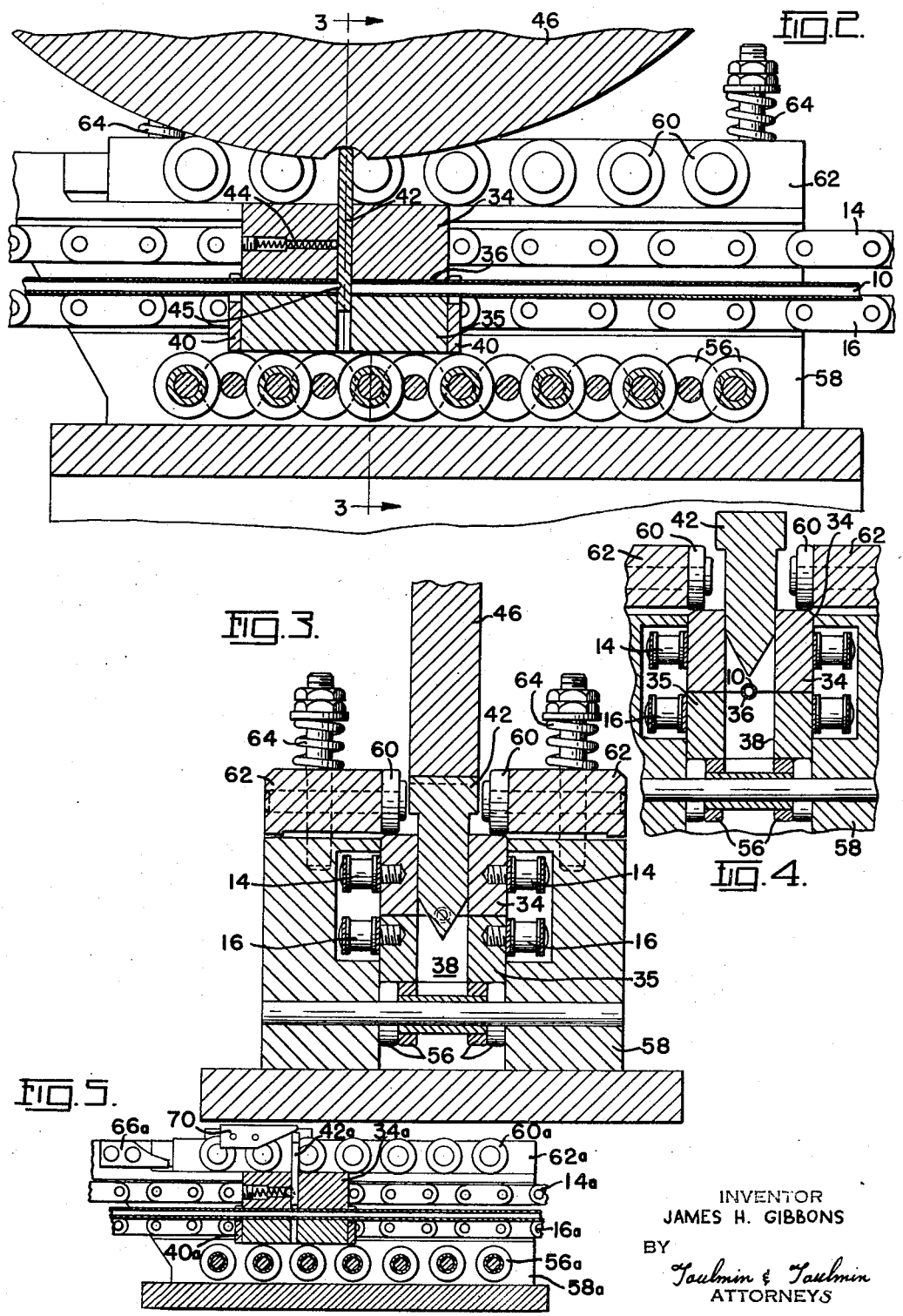

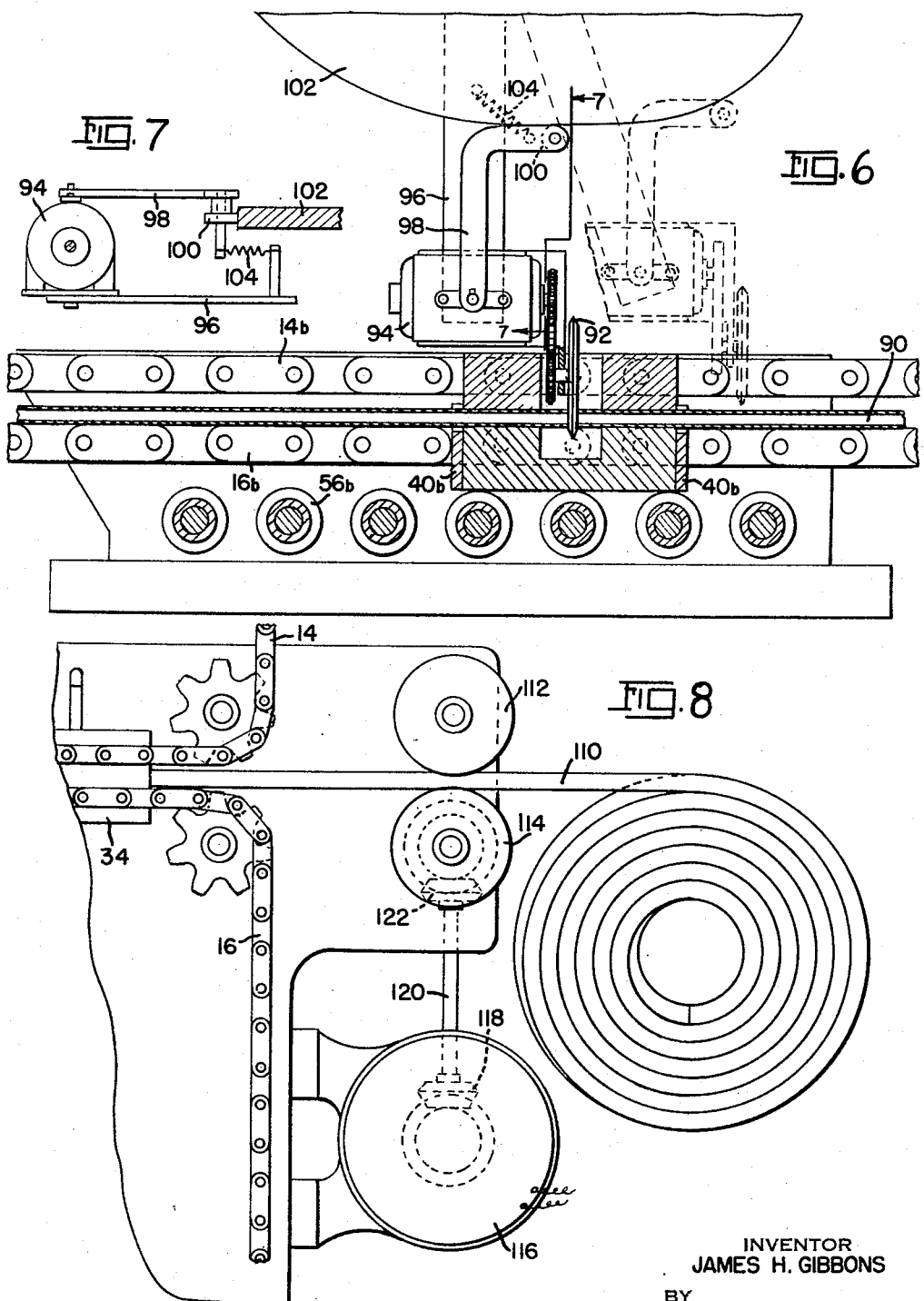

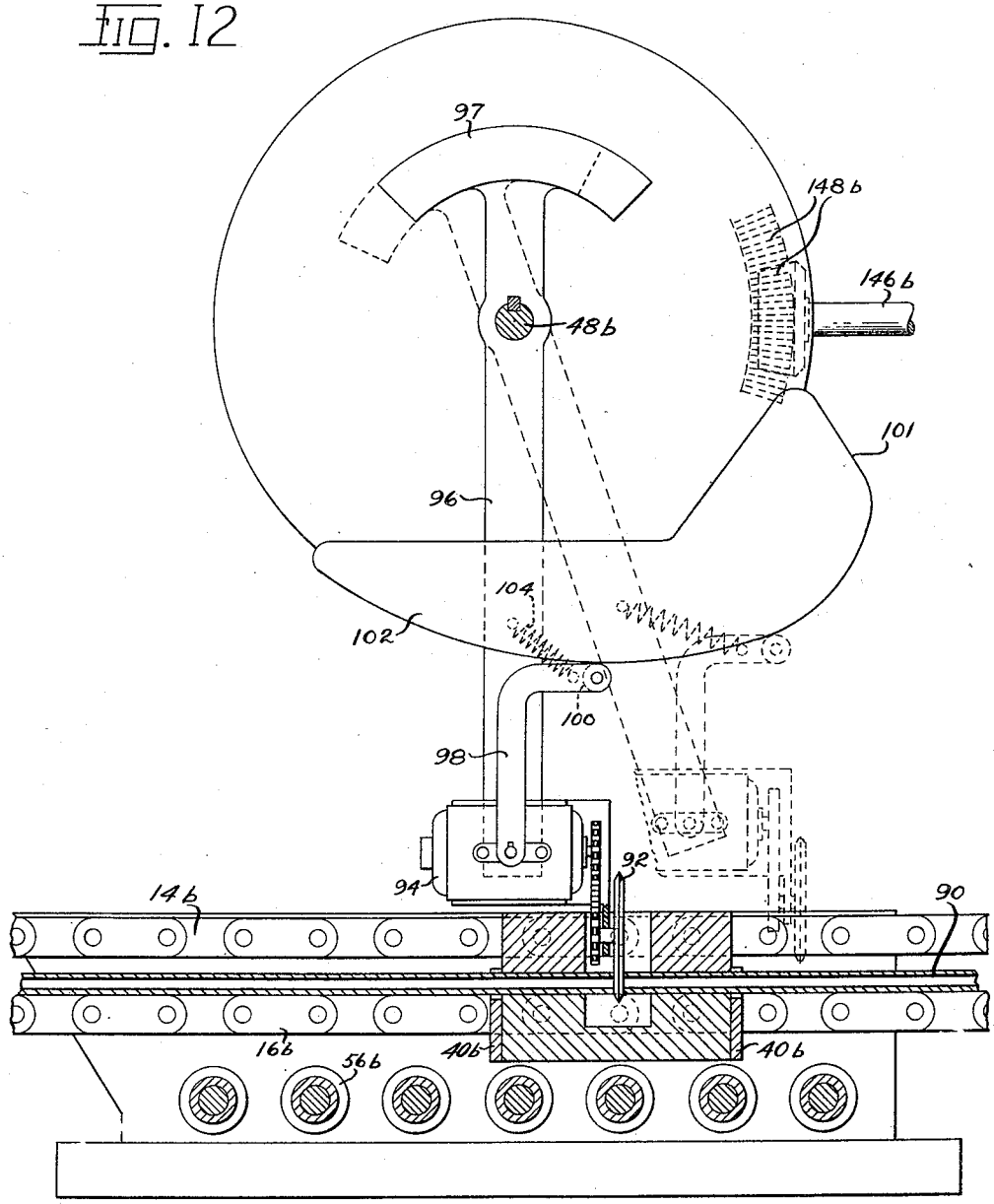

Patented Apr. 3, 1951

2,547,157

UNITED STATES PATENT OFFICE 2,547,157

CUTOFF MECHANISM

James H. Gibbons, Tipp City, Ohio

Application February 13, 1947, Serial No. 728,225

9 Claims. (Cl. 164—49)

This invention relates to machine tools, and particularly to an apparatus for cutting off tubing or the like which is produced in a substantially continuous form.

In the manufacture of tubing, molding and similar work members, there is generally a continuously operating mill from which the work member emerges as a continuous strip.

In most instances it is not desired to utilize the work member in pieces in excess of, say, 20 feet in length. In the majority of cases the finished workpiece is of a substantially shorter length and the work member must either be severed approximately to length as it emerges from the mill, or longer lengths thereof must be reduced to the smaller lengths by subsequent machining operations.

Inasmuch as the speed of operation of mills for producing work members of this type is high, running as fast as 60 to 100 feet per minute, the latter course is generally followed.

This is due to the fact that heretofore cut-off equipment for use in connection with mills and the like has consisted of a reciprocating tool carrying head member which moves with the work member during the cutting off period and then is retracted to its starting position for a new cut. It will be obvious that with reciprocating tool carrying heads it is difficult to develop the high speeds necessary to sever the workpiece emerging from a high speed mill into a plurality of short lengths.

The primary object of the present invention is to provide an improved type cut-off mechanism for tube mills and the like which is operable to sever the work member emerging from the mill into smaller pieces of any desired length.

It is still another object in a cut-off device for a mill or the like to eliminate reciprocating tool carrying heads thereby promoting smoother operation and making possible the severing of the work member into smaller pieces.

It is a still further object to provide a cut-off mechanism for a tube mill or the like which is adjustable for severing workpieces of any length from the work member emerging from the mill.

A still further object is the provision of a cut-off mechanism for a tube mill or the like which is operable to run at very high speeds but can accomplish this without detracting from the efficiency of the cutting-off operation.

These and other objects and advantages will become more apparent upon reference to the following description and the accompanying drawings in which:

Figure 1 is an elevational view of one form of the present invention;

Figure 2 is an enlarged sectional view through the device of Figure 1 at the cut-off station;

Figure 3 is a transverse section indicated by the line 3—3 on Figure 2;

Figure 4 is a view similar to Figure 3 but showing the cutting-off mechanism in a different position;

Figure 5 is a view showing a modified arrangement for actuating the cut-off plunger;

Figure 6 is a view similar to Figure 1 but showing how an abrasive cut-off tool could be employed;

Figure 7 is a sectional view indicated by the line 7—7 on Figure 6;

Figure 8 is a side elevation of a modified form at the end where the tubing is fed into the cut-off station;

Figure 9 is another side elevation developing an arrangement for driving the cut-off apparatus from the forming mill;

Figure 10 is a detailed view similar to Figure 9 of a further refinement of the arrangement depicted in Figure 9; and Figure 11 is a detailed section taken about on the plane represented by the line 11—11 of Figure 10; Figure 12 is a fragmentary view showing the drive for the cutter disc supporting arm of Figure 6.

Referring to the drawings, there is shown a work member 10 which could comprise any shape adapted for being formed on a continuous mill such as any of the various shapes of molding, or could comprise a cylindrical tube as shown. The work member 10 is adapted for being cut off into shorter workpieces by a mechanism generally indicated at 12 and which comprises the chain units 14 and 16, each of which consists of a pair of spaced apart endless chains, which pass around the sprockets 18 and 20, respectively. One each of the sprockets 18 and 20 has its shaft driven as by the bevel gears 22 which are operated by the bevel gears 24 on the shafts 26. The shafts 26, in turn, are driven from the output shaft 28 of the motor 30 through the bevel gears indicated at 32.

Between the chains 14 there are carried a series of blocks 34 spaced along the said chains a predetermined distance apart. Similarly, there are carried between the chains 16 a series of blocks 35 each of which registers with one of the blocks 34 as the chains move together across the center of the cut-off mechanism. The blocks may be releasably secured to the chains to permit the spacing thereof at different intervals and may further be adjustable along the chains by other means so that any length of workpiece may be produced. The blocks 34 and 35 are centrally recessed as at 36, as best seen in Figures 2, 3 and 4, for receiving the work member 10.

A slot 38 passes completely through both blocks and is held in accurate registration when the blocks are together by the plates 40 carried on the block 35 and overlapping the block 34.

In the upper block 34 is a punch 42 of the cutting type which, when actuated downwardly, severs the work member 10 where it intersects the slot 38. The punch 42 is normally retained in its upper position by a detent mechanism at 44 comprising a spring and a ball pressed thereby which engages the groove 45 in the said punch when the latter is in its retracted position.

The punches 42 are actuated in their punching movements by a notched wheel 46 which is carried on a shaft 48 geared to the output shaft 28 of the motor 30 through the bevel gears at 50 and 52. It will be apparent that the rotation of the notched wheel 46 will be in absolute synchronism with the travel of the chains and blocks. Thus, the notches 54 of the wheel may be adjusted into register with the punches 42 and will thereafter engage the punches in sequence for severing the work member 10.

During the punching operation, the blocks 34 and 35 are held closely together by being carried over a series of rollers 56 which are mounted in a stationary frame 58, and beneath a series of rollers 60 which are carried on the plates 62 mounted on top of the frame 58. Preferably, the plates 62 are spring pressed toward the frame 58 by the springs 64 so that when the blocks 34 and 35 are pulled into the frame by the chains 14 and 16, the rollers 56 and 60 tightly embrace the said blocks therebetween and thus hold the work member firmly during the punching operation.

After the blocks 34 and 35 emerge from the left end of the frame 58, the punches 42 are moved to their retracted position by an inclined cam means indicated at 66 which is stationarily mounted relative to the said frame. Thereafter, because of the detent mechanism at 44 and 45, the punches remain in their retracted position until again actuated inwardly by one of the notches 54 by the wheel 46.

For the purpose of synchronizing the speed of operation of the cut-off mechanism 12 with the operation of the mill which is supplying the work member 10, the motor 30 may be of variable speed. In the event the work 10 is fed to the cut-off at a rate less than the speed imparted by the motor 30 the over-running clutch shown at 31 will accommodate this difference. A brake 33 is normally held in ineffective position by a solenoid 29 that is energized when the switch 27 is closed as an incident to starting the motor 30.

It will be understood, however, that the work members 10 need not necessarily be fed directly to the cut-off mechanism from a mill, but may comprise any lengths it is desired to reduce to shorter lengths.

In Figure 5 there is illustrated a somewhat modified arrangement wherein parts similar to those in Figures 1 through 4 are similarly identified with the addition of a subscript a.

In Figure 5 the modification resides in the fact that the punch 42a is actuated in its punching direction by a stationary cam 70 suitably mounted in the frame 58a. As before, the punches are retracted by the action of a fixed cam indicated at 66a.

In Figures 6 and 7 there is shown a still further modification wherein there is a work member 90 which is adapted for being severed or cut off by the action of an abrasive wheel or saw as at 92. The wheel or saw 92 is driven by a motor 94 which is pivotally mounted on the end of a rotating arm 96, the rotation of the arm being accomplished in a manner similar to the driving of the wheel 46.

Secured to the frame of the motor on the side opposite its pivotal connection with the arm 96 there is an arm 98 which carries a cam roller 100 that rides on the surface of a cam 102. A spring 104 is provided which continuously urges the arm 98 and, therefore, the motor 94 in a counter-clockwise direction about the pivotal connection with the motor of the arm 96 in order to hold the roller 100 firmly against the surface of the cam.

The cam 102 is so shaped that the cut-off member 92 moves at right angles into and away from the work member 90 during the cutting-off operation. This insures a square end on the cut-off workpiece and the use of an abrasive cut-off member or a saw insures that there will be a minimum of deformation of the work member during the cutting-off operation.

The parts of the apparatus in Figures 6 and 7 which correspond to parts in Figure 1 are correspondingly numbered with the addition of a subscript b.

Figure 12 shows somewhat more in detail the arrangement for driving a rotating arm 96 which carries the rotatable cutting disc. In this figure it will be seen that the arm 96 is preferably counter-balanced as by the counter-balance means 97 and that it is mounted on a shaft 48b which is connected to be driven by the bevel gear set indicated at 148b and arranged similarly to the bevel gear drive for the rotary cam member in Figures 1 and 9. The smaller of the bevel gear sets is mounted on a shaft 146b and the shaft is driven by engagement with one of the sprockets for the chain 14b, as indicated in Figure 9 or is driven directly from some suitable source of power as is indicated in Figure 1 in connection with the drive for the rotary cam member shown therein.

The cam member 102 is shown somewhat more in detail in Figure 12 than it is in Figure 7, and it will be seen that it comprises a part 101 adapted for engagement with the roller 100 of the arm 98 in order to lead the said roller to the intermediate portion of the said cam which causes the arm to assume such positions that the cutting disc 92 will always be presented at a fixed angle to the workpiece 90.

Instead of being fed to the cut-off mechanism directly from a mill the work, such as a tube, may be wound on a reel which is mounted in close proximity to the cut-off mechanism. Such an arrangement is illustrated in Figure 8 wherein the work takes the form of a tubing 110 that is coiled on a reel as illustrated. This reel is mounted for rotation at a location convenient to the cut-off mechanism.

The supporting frame work of the latter carries a pair of complemental feed rolls 112 and 114 which are positioned in advance of the chains 14 and 16 and between which the tube passes. There is sufficient frictional engagement between the feed rolls 112 and 114 and the tubing 110 so that as the feed rolls are driven the tubing will be pulled from the reel.

The framework of the cut-off mechanism also carries a motor 116, which, through the bevel gear connection at 118 drives a drive shaft 120. The latter, through the bevel gear arrangement depicted at 122, drives the feed roll 114.

It is entirely practical to eliminate the motor 30 and associated mechanisms and drive the cut-off mechanism directly from the work forming mill. Such an arrangement is illustrated in Figure 9. In this view the mill is shown fragmentarily and is referred to generally as M. The mill M includes a shaft 130 which is power driven and which may be taken as a source of power.

Drivably mounted on the shaft 130 is a gear 131. Meshing with the gear 131 is a pinion 132 which carries coaxially a feed roll 134. Meshing with the pinion 132 is a second pinion 136. The latter is substantially a duplicate of the pinion 132. Coaxially carried by the pinion 136 is a feed roll 138 that is complemental to the feed roll 134.

The work 10 is frictionally engaged by the feed rolls 134 and 138 and is fed, under power, to the blocks 34 and 35. Thus the blocks are moved, under power, from the work. The block 34 in turn drives the chain 14. Meshing with the latter is a drive sprocket 140. The latter is drivably connected to a bevel gear 142 which meshes with a complemental bevel gear 144.

The gear 144 is drivably mounted on one end of a shaft 146 and the opposite end of this shaft 146 is drivably connected to the wheel 46 by the driving connection indicated at 148. Thus the mill M, from the drive shaft 130, and through gear 131, pinions 132 and 136 and feed rolls 134 and 138, work member 10, blocks 34 and 35, chain 14, sprocket 140, bevel gears 142 and 144, and shaft 146 drives the wheel 46 of the cut-off mechanism.

A somewhat different arrangement for driving the cut-off mechanism from the mill M is illustrated in Figure 10. Here the shaft 150 is taken as the source of power. Drivably carried by the shaft 150 is a bevel gear 152 which meshes with a complemental bevel gear 154 carried at one end of a stub shaft 156. The latter is connected to a uni-directional clutch which is depicted at 158. Extending from the latter is a second stub shaft 160 which carries, at its free end, a bevel gear 162. This gear 162 meshes with a complemental bevel gear 164 that drivably carries a drive sprocket 166.

The sprocket 166 engages with the chain 14 and drives the chain under power from the mill M. The drive from the chain 14 is transmitted to the wheel 46 in the manner above described in connection with Figure 9.

It is evident that as the mill M and cut-off mechanism are started into operation there is a direct transfer of driving power from the mill to the cut-off. However, should the latter get to moving at a speed less than that at which the mill is operating the condition is accommodated by the uni-directional clutch 158.

It will be seen that the cut-off mechanism of this invention eliminates reciprocating cut-off heads and the like which characterizes the usual continuous cut-off apparatus. This makes for a quieter operating and longer lived device and permits continuous movement of the work member even when the cut-off pieces are quite short.

The device of this invention is readily adaptable to any type of work member and can operate in connection with a mill which is producing molding or tubing, or independently for reducing long length work members to shorter workpieces.

It will be understood that this invention is susceptible to modification in order to adapt it to different usages and conditions and, accordingly, it is desired to comprehend such modifications within this invention as may fall within the scope of the appended claims.

I claim:

1. In a cut-off mechanism having a cut-off station; a pair of opposed endless chain units movable together through said station; a plurality of spaced apart blocks carried by each of said chains and each adapted for registering with one of the blocks on the other of said chains during their travel through said cut-off station; means for introducing a work member between said blocks as they are brought together by said chains and for thrusting the work member in its direction of movement for driving said chains; a cut-off member carried by one of said blocks; and means responsive to movement of said chain by said work member for actuating said cut-off member to sever said work member during the travel thereof through said station.

2. In a cut-off mechanism having a cut-off station; a pair of opposed endless chain units movable together through said station; a plurality of spaced apart blocks carried by each of said chains and each adapted for registering with one of the blocks on the other of said chains during their travel through said cut-off station; means for introducing a work member between said blocks as they are brought together by said chains and for maintaining a thrust on said work member in its direction of movement thereby to drive said chains; a cut-off member carried by one of said blocks; movable cam means to actuate said cut-off member to sever said work member during its travel through said station; and means drivingly connecting said cam means with one of said chains.

3. In a cut-off mechanism having a cut-off station; a pair of substantially co-planar opposed endless chain units movable together through said station; a plurality of spaced apart blocks carried by said chain units and each adapted for registration with one of the blocks on the other of said units during their travel through said station; means for receiving a work member between said blocks; a punch carried in each of said blocks; a rotatable cam for actuating said punches in said cut-off station; drive means for driving said cam in synchronism with the travel of said chain units; fixed cam means to retract said punches from their actuated position; and detent means to retain said punches in their retracted position until again actuated by said rotatable cam.

4. In a cut-off mechanism having a cut-off station; a pair of opposed endless chain units movable together through said station; spaced apart blocks carried by said units and adapted to register during their travel through said station; means for receiving a work member between said blocks; driving means for driving said chain units; one of said blocks being apertured and cut-off means acting through said aperture and operable during their travel through said station to sever said work member, said cut-off means comprising a cutting disc, and means to support and guide said disc into and out of said aperture at a fixed angle to the direction of movement of said work member.

5. In a cut-off mechanism having a cut-off station; a pair of endless chain units movable together through said station; spaced apart blocks carried by said units and adapted to register during their travel through said station; means for receiving a work member between said blocks; driving means for driving said chain units; cut-off means comprising a rotary cutting disc acting through one of said blocks during the travel thereof through said cutting station to sever said work member; and cam means operable to guide said cutting disc into and out of said station while maintaining said disc at a fixed angle to the axis of said work member.

6. In a cut-off mechanism having a cut-off station; a pair of endless chain units movable together through said station; spaced apart blocks carried by said units and adapted to register during their travel through said station; means for receiving a work member between said blocks; driving means for driving said chain units; a cut-off disc for acting through one of said blocks to sever said work member during its travel through said cut-off station; a rotatable arm supporting said cutting disc; means pivotally mounting said cutting disc on the end of said arm; a fixed cam; and a roller connected with said cutting disc and yieldably urged against said cam, said cam being shaped to maintain the axis of said cutting disc at a fixed angle with the axis of the work member during the cutting off operation.

7. In combination, a work forming mill including a drive shaft, a cut-off mechanism including a chain, a work receiving block carried by said chain, and a punch actuating wheel; means for driving said wheel from said shaft comprising feed rolls driven by said shaft and receiving work from said mill, and driving connections between said chain and said wheel.

8. In combination, a work forming mill including a drive shaft, cut-off mechanism including a punch actuating wheel, and connections for driving said wheel from said shaft, said connection including a uni-directional clutch.

9. In combination, a work forming mill including a drive shaft, cut-off mechanism including a chain, a work receiving block carried by said chain, and a punch actuating wheel; means for driving said wheel from said shaft comprising feed rolls driven by said shaft, a drive sprocket associated with said chain, a driving connection between said shaft and said sprocket, a uni-directional clutch included in said driving connections, and operative connections between said chain and said wheel.

JAMES H. GIBBONS.

REFERENCES CITED

The following references are of record in the file of this patent:

UNITED STATES PATENTS

| Number | Name | Date |
|---|---|---|
| Re. 15,566 | Wulff | May 27, 1923 |
| 556,857 | Madden | Mar. 24, 1896 |
| 1,364,271 | Gail | Jan. 4, 1921 |
| 1,457,662 | Ford | June 5, 1923 |
| 1,457,663 | Ford | June 5, 1923 |
| 1,463,314 | Ford | July 31, 1923 |
| 1,716,425 | Conti | June 11, 1929 |
| 1,740,430 | Mudd | Dec. 17, 1929 |
| 1,751,293 | Sherman | Mar. 18, 1930 |
| 1,944,718 | Rafter | Jan. 23, 1934 |
| 2,329,256 | Edelman | Sept. 14, 1943 |
| 2,332,013 | Rudert | Oct. 19, 1943 |
| 2,367,521 | Pero | Jan. 16, 1945 |

FOREIGN PATENTS

| Number | Country | Date |
|---|---|---|
| 506,399 | Great Britain | May 26, 1939 |
| 279,451 | Great Britain | 1929 |
| 647,189 | Germany | June 29, 1937 |